March 24, 1970 J. VAN LARE 3,501,834

GRASS-CUTTING TOOL EMPLOYING RAZOR BLADES

Filed Nov. 28, 1967

INVENTOR
JAKOB VAN LARE
BY
Owen, Wickersham & Erickson
ATTORNEYS

United States Patent Office 3,501,834
Patented Mar. 24, 1970

1

3,501,834

GRASS-CUTTING TOOL EMPLOYING RAZOR BLADES

Jakob van Lare, Ruyslaan 25, De Koog, Netherlands

Filed Nov. 28, 1967, Ser. No. 686,024
Claims priority, application Netherlands, July 19, 1967, 6710034
Int. Cl. B26b *5/00*
U.S. Cl. 30—318 5 Claims

ABSTRACT OF THE DISCLOSURE

This cutting tool is especially useful for trimming or cutting grass. A generally triangular ground plate is provided with studs and razor blades are located by the studs to project slightly along two sides of the ground plate. A triangular upper plate lies over the razor blades and is held by the studs, and a handle has a plate secured over the upper plate, all the plates being rigidly secured together, as by a single bolt with a wing nut.

This invention relates to a cutting tool, particularly a grass-cutting tool.

In prior-art hand-driven grass-cutting tools the grass is, in general, sheared between two knives with cutting faces that approach and then closely overlap each other.

Another type of grass-cutting tool is the sickle, which cuts grass by the high speed with which its sharp blade is moved through the grass; its disadvantages are that proper use of a sickle requires considerable skill and takes a lot of energy.

An object of the present invention is to get the advantages of a sickle while obviating the named disadvantages of the sickle, so that grass is cut easily and without much skill on the part of the user.

My invention is characterized by having a triangular ground plate provided with studs for positioning and retaining in place a plurality of razor blades (or other razor-like blades) located along two sides of the triangle. The studs also locate and retain in place an upper plate and a handle member. The ground plate and upper plate are thin and the razor blades project slightly beyond them, so that the grass is cut in a very simple manner with a very slight expenditure of energy, by a lateral movement of the cutting tool while the face of the ground plate is kept parallel to the soil.

An important advantage of the use of my new cutting tool is that the grass is not torn off, as is the case with shears, where the cutting knives approach and closely overlap each other. Another advantage is that the grass is not damaged, as it is with inexpert or faulty manipulation of a sickle.

A further feature of my new cutting tool is that the upper plate and the ground plate as well as the stem are provided with registering holes, through which a bolt can be passed, so that by means of a wing nut the parts can be united to each other and the plates held immovable relative to each other, while the handle cannot be moved relative to the upper plate since, preferably, a stud of the ground plate is held in a recess of the loose handle member.

The invention will be described more fully with reference to the following drawings.

Figures 1, 2, 3:
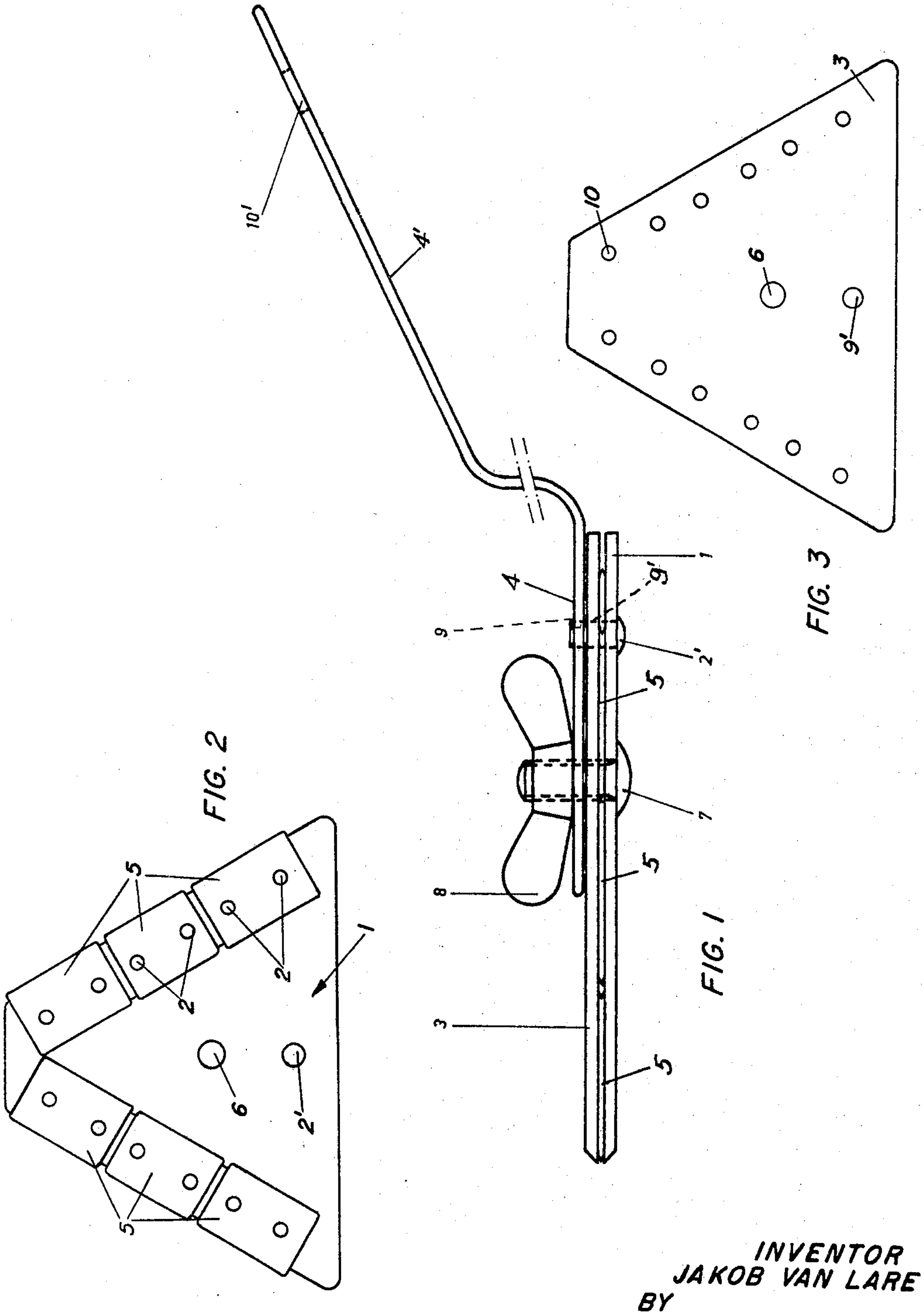
FIG. 1 is a view in side elevation of a cutting tool embodying the principles of the present invention.
FIG. 2 is a plan view of the ground plate with the razor blades in place.
FIG. 3 is a plan view of the upper plate.

Referring to the figures, a generally triangular ground plate 1 is provided with studs 2, which may be punched from the plate 1 or may instead be formed by so-called headed nails or rivets. At any rate, the studs 2 are long enough to extend into the upper plate 3, and a stud 2′ is long enough to fit in a recess 9 of a plate portion 4 of a handle 4′. The handle 4′ itself may be short or long, as desired.

2

The distance between the studs 2 is preferably chosen so that the recesses conventionally provided in standard double-edged safety razor blades (as used for shaving) correspond therewith. In the present embodiment three safety razor blades 5 are provided on each of two sides, but there may be more or fewer, as desired and in accordance with a desired size of device.

The ground plate 1, the upper plate 3 and the handle plate portion 4 are each provided with through openings 6, through which passes a bolt 7; a wing nut 8 may be used for securing the parts together. The handle plate 4 is provided with an opening 9 for receiving the stud 2′, and the upper plate 3 is provided with holes 10 which are spaced and sized to receive the studs 2 and with a hole 9′ for the stud 2′. The plates and handle of the cutting tool may be made of metal or of a synthetic resin.

It will be apparent from FIG. 2 that the razor blades 5 do not overlap each other and razor blades are so thin that no grass gets in between the upper plate 3 and the ground plate 1. Moreover, since the studs 2 extend at least well into the holes 10 of the upper plate 3, the razor blades 5 are not able to shift but are kept in place.

The handle 4′ may be provided with an opening 10′, so that the cutting tool can be suspended easily from a tractor or other device for machine trimming.

In use the handle 4′ is moved by hand or by machine in such a way that the ground plate 1 moves over the ground parallel to the ground at a desired height, and in a direction generally parallel to the edge not having any razor blades. It may be used in either direction or back and forth.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A cutting tool, particularly useful for cutting grass, including in combination:

a generally triangular ground plate having an upper surface provided with upwardly projecting studs, said ground plate having a rear edge and forwardly converging side edges meeting said rear edge at identical angles, said plate approximating an equilateral triangle.

razor blades located by said studs to project slightly out from, along, and parallel to the forwardly converging side edges of said ground plate, a generally triangular upper plate having the same area as said ground plate lying over said razor blades and held by said studs, and means securing them all together rigidly, whereby, when said tool is moved generally parallel to the rear edge and to the ground, the cutting edges of the razor blades meet the grass at an angle that improves the cutting action.

2. The cutting tool of claim 1 having a handle secured to the said plates for supporting them for easy movement parallel to said rear edge.

3. The cutting tool of claim 2 wherein the ground plate, the upper plate, and the handle are provided with registering hole means, and the plates and handle are secured together by bolt means extending through said registering hole means, and securing means for said bolt means.

4. The cutting tool of claim 2 wherein said handle terminates in a plate parallel to said ground plate and overlying said upper plate, the position of the handle being determined by an opening in said handle plate, one of said studs engaging said opening.

5. A cutting tool including in combination:
- a generally equilateral triangular ground plate having upwardly-extending studs, with a rear edge and forwardly inclined side edges,
- a plurality of safety razor blades located side by side and retained by said studs on top of said ground plate to project slightly beyond and parallel to each of the forwardly inclined side edges of said ground plate,
- a generally triangular upper plate the same area as said ground plate and on top of said razor blades and held in position by said studs,
- a handle having a plate portion lying over said upper plate, said plate portion having an opening engaged by one of said studs, said ground plate, upper plate, and handle plate each being additionally provided with registering hole means,
- bolt means extending through all said registering hole means, and
- a wing nut securing said bolt means in place,
- whereby movement of said tool generally parallel to the ground in the direction of said rear edge causes the razor blade edges to meet grass or weeds at an acute angle that cuts through their stems whereas meeting them perpendicularly tends to push the grass or weeds over instead of cutting them.

References Cited

UNITED STATES PATENTS

| | | | |
|---|---|---|---|
| 1,042,243 | 10/1912 | Long | 30—318 |
| 2,697,877 | 12/1954 | Reynolds | 30—318 |
| 2,787,058 | 4/1957 | Vogel | 30—318 |

ROBERT C. RIORDON, Primary Examiner

J. C. PETERS, Assistant Examiner